Sept. 28, 1965   D. F. BRYANS ETAL   3,208,508
AIR CONDITIONING SYSTEM AND METHOD
Filed Dec. 15, 1961   2 Sheets-Sheet 1

INVENTORS
DAVID F. BRYANS
BORIS W. HARITONOFF
BY
Seymour Rothstein
ATTORNEY.

Sept. 28, 1965  D. F. BRYANS ETAL  3,208,508
AIR CONDITIONING SYSTEM AND METHOD
Filed Dec. 15, 1961  2 Sheets-Sheet 2
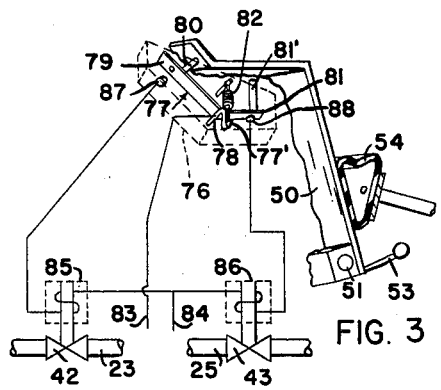
FIG. 3
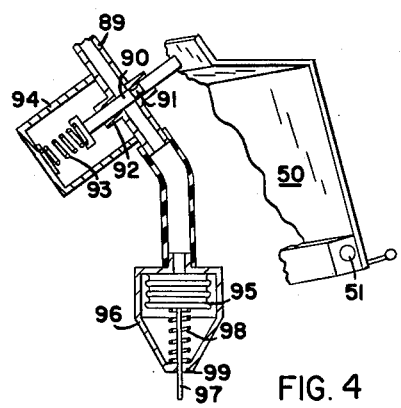
FIG. 4
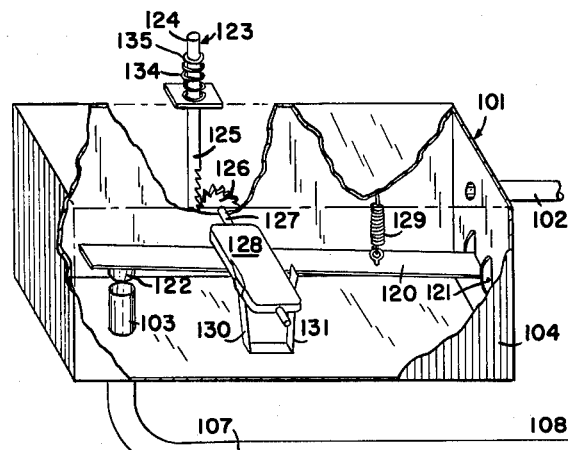
FIG. 5
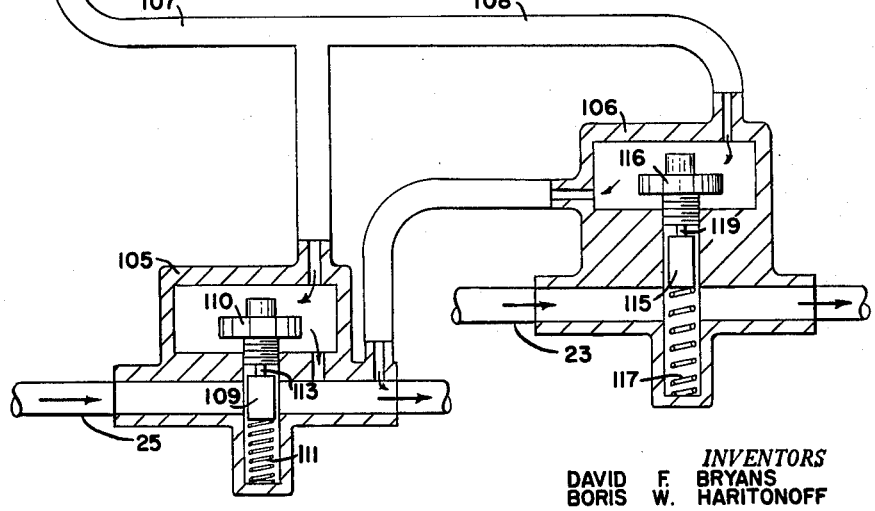
INVENTORS
DAVID F. BRYANS
BORIS W. HARITONOFF
BY
Seymour Rothstein
ATTORNEY.

United States Patent Office 3,208,508
Patented Sept. 28, 1965

3,208,508
AIR CONDITIONING SYSTEM AND METHOD
David F. Bryans, Syracuse, and Boris W. Haritonoff, Geneseo, N.Y., assignors to Carrier Corporation, Syracuse, N.Y., a corporation of Delaware
Filed Dec. 15, 1961, Ser. No. 159,625
13 Claims. (Cl. 165—2)

This invention relates to air conditioning, and more particularly to an air conditioning system for selectively heating or cooling different zones or areas in a multi-zone building. Further, this invention relates to an air conditioning system having at least one induction unit in each zone to be treated, each induction unit comprising a heat exchange coil adapted to be supplied with a hot conditioning medium and a cold conditioning medium, respectively, and having a single return outlet. Suitable valve means are provided to regulate the flow of hot conditioning medium and cold conditioning medium to the heat exchange coil. Within each induction unit is a bypass damper for controlling the quantity of zone air passing over the heat exchanger.

An object of this invention is to provide an improved air conditioning system which is efficient through wide ranges of application and use.

It is another object of this invention to provide an improved air conditioning system for multiple-zone buildings which is rapidly responsive to maintain even temperatures in the different zones despite rapid changes in intense solar and lighting loads.

Another object of the present invention is to provide an air conditioning system having a plurality of induction units, each having a heat exchanger adapted to be supplied with either a hot or a cold conditioning medium and having novel controls for regulating the supply of hot or cold medium to the heat exchanger.

A further object of this invention is to provide an air conditioning system including an induction unit having a heat exchanger supplied with either a hot or a cold conditioning medium and having a bypass damper therein which cooperates with a control to regulate the supply of hot or cold conditioning medium to the heat exchanger.

A still further object of the present invention is to provide an air conditioning system with an induction unit of improved design, a unit which is compact and can be factory assembled such that field installation time is materially reduced.

Another object of this invention is to provide a novel method of conditioning air in a multi-zone building.

These and other objects of the present invention will become hereafter more apparent.

This invention relates to an air conditioning system for a building having a plurality of zones. A central station is provided remote from the zones for conditioning air to be supplied to the zones. Included in the air conditioning system are at least one induction unit in each zone, means for delivering a quantity of high-pressure conditioned air from the central station to each of the units, means in each unit for discharging the conditioned air within the units at relatively high velocity so as to induce zone air into the units, a heat exchanger in each unit, means for supplying cold conditioning medium to the heat exchanger, means for supplying hot conditioning medium to the heat exchanger, valve means to regulate the flow of conditioning medium to the heat exchanger, means to return conditioning medium from each of the units in a single return stream for recirculation, a damper in each unit for controlling the quantity of induced air passing over or bypassing each heat exchanger, means for actuating the damper, and means responsive to a predetermined position of the damper for controlling the valve means to supply either hot conditioning medium or cold conditioning medium to the associated heat exchanger.

This invention also relates to an air conditioning unit comprising a casing having an inlet and an outlet, a plenum chamber in the casing, means for supplying primary air to the plenum chamber, a heat exchanger in the casing, means for supplying cold medium to said heat exchanger, means for supplying hot medium to the heat exchanger, the discharge of primary air through the outlet inducing air to be treated into said casing through the inlet, damper means for regulating the quantity of induced air passing over or bypassing the heat exchanger, control means for selectively positioning the damper means, and means responsive to a predetermined position of the damper means for selectively actuating the cold medium supplying means or the hot medium supplying means.

This invention also relates to a method of conditioning air in a multiple-zone building which requires heating and cooling comprising the steps of supplying primary air from a source to induce zone air to pass in heat exchange relation with a coil member, moving a damper to regulate the quantity of zone air being passed in heat exchange relation with the coil member, supplying a hot conditioning medium to the coil member, supplying a cold conditioning medium to the coil member, and selecting the supply of conditioning medium to the coil member in response to a predetermined position of the damper.

These objects and features will be made most manifest and particularly pointed out in clear, concise and exact terms in conjunction with the accompanying drawing wherein:

FIGURE 3 is a schematic view, partly in section, illustrating a preferred embodiment of a control arrangement for regulating the supply of conditioning medium;

FIGURE 4 is a schematic view of a force amplifying mechanism that can be employed with the present invention; and FIGURE 5 is a modification of the control arrangement for regulating the supply of conditioning medium illustrated in FIGURE 3.

Figure 1:
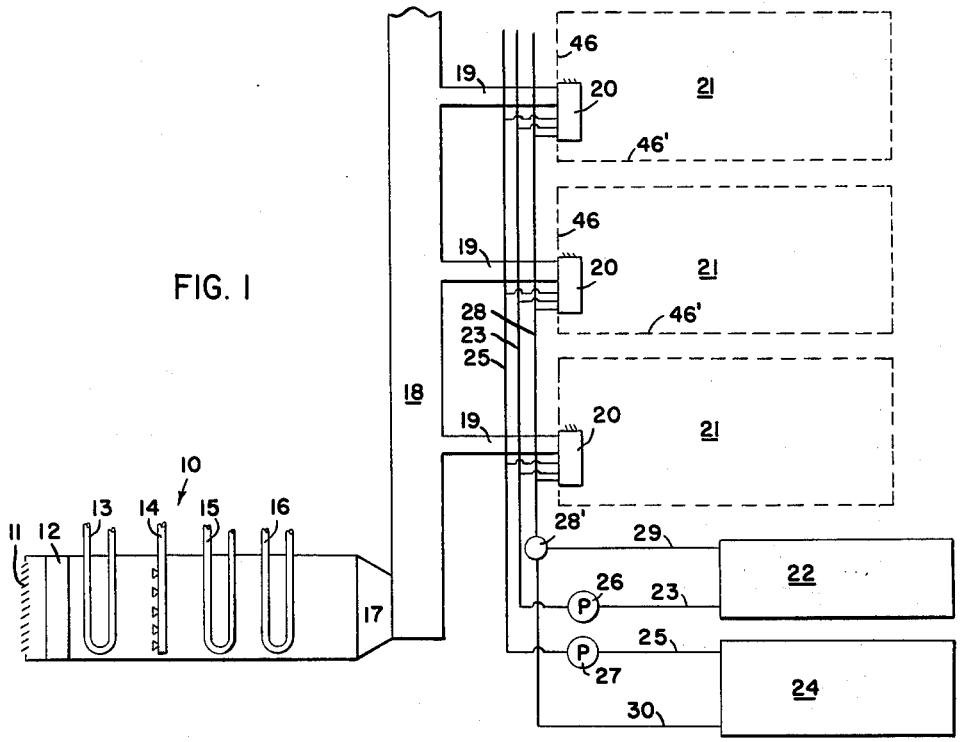
FIGURE 1 is a diagrammatic view of an air conditioning system of the present invention.

In the description which follows, like numerals designate like elements in each of the several views of the drawing. Referring to FIGURE 1 of the attached drawing, there is shown an air conditioning system of the induction type employing the present invention. The air conditioning system comprises a central station 10 including dampers 11 through which exterior air to be conditioned may pass into the central station, filter 12, precooling coil 13, spray attachment 14, cooling coil 15, heating coil 16 and fan 17. Fan 17 draws air through the dampers into the central station where the air is treated and supplies this treated air as a source of primary air through riser 18 and runouts 19 to room units 20 placed in the areas or zones 21 being treated. The primary air is at relatively high static pressure, preferably in the range between 1.5 inches water gauge and 5 inches water gauge, and at relatively high velocity, on the order of 3,000 to 5,000 feet per minute. It will be observed that the room units 21 are shown in greater detail in FIGURE 2.

Refrigeration machine 22 is provided to furnish cold conditioning medium through cold medium supply line 23 to each of the room units. Pump 26 in cold medium supply line 23 draws cold medium from the refrigeration machine and forwards the same to the room units.

Heating station 24 is provided to supply hot conditioning medium through hot medium supply line 25 to each of the room units. Pump 27 in hot medium supply line 25 is employed to force the medium to each of the room units. Water is the preferred medium, however, other fluids, for example, a solution of water and glycol alcohol may be used as will be apparent to persons skilled in the art.

The water returns from each of the room units through common return line 28 which communicates with branch line 29 connected to refrigeration machine 22 and with branch line 30 connected to heating station 24. An automatic diverting valve 28' is provided to direct the return water to either line 29 or line 30. When the water is above a predetermined temperature, for example, 72° F., it will be diverted from line 28 into line 30 for return to heating station 24. If the water is below the predetermined temperature, it will be diverted into line 29 for return to refrigeration machine 22.

It is seen that the piping arrangement is of the type often referred to as a three-pipe system, one pipe supplying a hot conditioning medium to the heat exchanger within each room unit, a second pipe supplying cold conditioning medium to the heat exchanger within each room unit and a third pipe returning medium from the room units to the supply sources. Thus, both hot and cold conditioning medium are available at each room unit.

Figure 2:
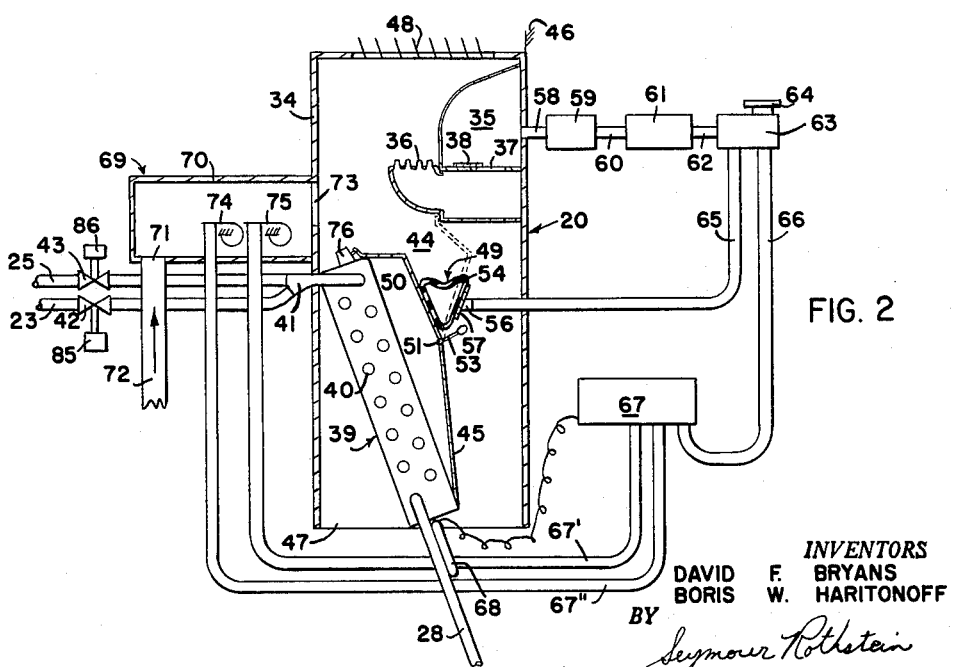
FIGURE 2 is a diagrammatic view, partly in section, of an induction unit of the present invention and a preferred control therefor.

Referring to FIGURE 2, there is shown a diagrammatic view of a room unit 20 as well as the controls therefor. Each room unit 20 includes a casing or enclosure 34 having therein a plenum chamber 35 which is connected to the runout 19 by conventional duct means. Plenum chamber 35 is provided with suitable discharge means 36 to discharge primary air within the units. Discharge means 36 may comprise separate spaced nozzles as shown or may be a single slot-type nozzle. The flow of air from plenum chamber 35 to nozzles 36 through slot 37 may be regulated to maintain a predetermined pressure at the nozzles by means of slide plate or balancing damper 38 which is movable to open and close slot 37. Suitable adjustment means as, for example, a screw may be provided to adjust slide plate 38.

Heat exchanger 39 is provided within each room unit 20. In the embodiment of FIGURE 2, heat exchanger 39 comprises a coil 40 adapted to be connected to cold water supply line 23 and to hot water supply line 25 by connection 41. Preferably, coil 40 comprises a sepentine coil. If desired, lines 23 and 25 may be connected to a first circuit and a second circuit, respectively, within the heat exchanger. Disposed in lines 23 and 25 are solenoid-actuated valves 42 and 43 for regulating the supply of conditioning medium from the cold water supply line and the hot water supply line, respectively, to heat exchanger 39. Coil 40 is connected to line 28 for returning conditioning medium to refrigeration machine 22 and heating station 24, respectively.

It is noted that heat exchanger 39 is spaced from plenum chamber 35 so as to provide a bypass passage 44 for secondary air. Wall 45 in the room unit prevents passage of secondary air through the heat exchanger 39 when the bypass passage is fully open.

The room unit may be suspended from wall 46 of the building structure. Preferably, room unit 20 is spaced from floor 46' of the building structure to permit secondary air to be introduced into the unit from the bottom thereof.

Casing or enclosure 34 of room unit 20 includes inlet 47 in the bottom thereof to permit secondary air to be induced into the unit from the zone or area 21 to be treated and outlet 48 in the top thereof to permit a mixture of primary air and secondary air to be discharged into the area 21 to be treated.

Passage of secondary air through heat exchanger 39 is regulated by means of a bellows damper arrangement 49. Arrangement 49 includes a damper 50 substantially co-extensive with the length of heat exchanger 39.

Damper 50 is connected to shaft 51 which is journaled in supports secured within room unit 20. Shaft 51 is urged by counterbalance 53 in a direction to permit the damper to close bypass passage 44 and thus direct all of the induced air through the heat exchanger 39.

The means for actuating damper 50 to open the bypass passage comprises an expansible member or bellows 54 made of elastomeric coated fabric, preferably nylon coated with neoprene. Preferably the bellows does not expand and contract, but rather the side walls of the bellows pivot with respect to one another about hinge means formed by the apex of the bellows connecting the side walls. The bellows expands in response to increase in pressure within the bellows. Counterbalance 53 urges damper 50 clockwise to collapse the bellows. One side of the bellows or bladder 54 is affixed to a suitable support bracket 57 which is fixedly mounted in casing 34. The other side wall of the bellows pivots in response to an increase of pressure within the bellows and actuates the damper 50. Connector 56 is adapted to communicate bellows 54 with a source of control air.

The control mechanism for the bellows damper construction 49 is shown in FIGURE 2. Line 58 is at one end in communication with plenum chamber 35 and is connected at its other end with filter 59, which eliminates the dust particles which may have escaped the primary air filtering system. The control air then passes through line 60 to air pressure regulator 61 which will maintain a constant downstream pressure of approximately 1.5 inches of water column. Air then passes through line 62 restriction T 63. Within the restriction T is a sharp-edged orifice (not shown) from which the air passes into lines 65 and 66. Line 65 is connected to restriction T 63 approximately at the vena contracta of the orifice. As a consequence, lower pressures result within bellows 54, which enables the counterbalance 53 to more easily move damper 50 to close bypass passage 44. Safety relief valve 64 is provided in the restriction T 63. Line 66 connects one port of restriction T with changeover valve 67.

Changeover valve 67 communicates line 66 with either line 67' or 67", dependent upon the temperature of the conditioning medium flowing from heat exchanger 39. Preferably changeover valve 67 is regulated by means of a thermal actuator 68 positioned in intimate heat exchange relationship with the heat exchanger so that it is responsive to the temperature of the conditioning medium passing from the heat exchanger.

Control 69 which is responsive to the temperature in the area being treated is connected to the lines 67' and 67" respectively. Control 69 includes casing 70 having inlet 71 in communication with the secondary air by means of duct 72 and outlet 73 in communication with the passage adjacent the nozzles 36.

Within casing 70 adjacent the outlets of each line 67' and 67" are bimetallic elements 74 and 75. These elements sense the temperature of the secondary air induced through the casing 70 to bleed air from the line 67' and 67", respectively, thus varying the pressure imposed in bellows 54 during various operating conditions.

Referring now to FIGURE 3, there is schown schematically the means for controlling the flow of conditioning medium from cold water supply line 23 and hot water supply line 25 to heat exchanger 39. Counterbalance 53 normally urges the damper 50 clockwise to close bypass passage 44 and permit the full flow of air over the heat exchanger. As the pressure within the bellows 54 increases, the bellows will expand and damper 50 will be moved counterclockwise toward a position closing the path of the air passing over the heat exchanger and opening bypass passage 44. As damper 50 fully opens the passage 44, microswitch 76 is actuated to control solenoids 85 and 86 respectively.

Within the microswitch, there is a lever 77 pivoted at 78. The lever comprises arms 79 and 81. Mounted upon arm 79 of the lever is an upstanding lug or projection 80 which is adapted to be contacted by damper 50. Mounted upon arm 81 of lever 77 is an upstanding lug or projection 81'. Extending from lever 77 is a member 77' to which is secured overcenter spring 82 which urges the lever into engagement with either contact 87 or contact 88. Damper 50 urges lug 80 in a counterclockwise direction so as to cause arm 79 to engage contact 87. Damper 50 urges lug 81' in a clockwise direction to cause arm 81 to engage contact 88. Lever 77 may be formed from resilient material or the contacts may be spring-loaded to insure proper engagement between the arms and the contacts.

Current is supplied to the electrical circuit by leads 83 and 84 which are secured to a suitable source of electrical power, as for example, a supply of 110-volt current.

The circuit also includes solenoid 85 for actuating valve 42 in cold conditioning medium supply line 23 and solenoid 86 for actuating valve 43 in hot conditioning medium supply line 25. In the illustrated position of microswitch 76, arm 81 is in engagement with contact 88 closing the circuit to energize solenoid 86. Arm 79 is not in engagement with contact 87, thus solenoid 85 is deenergized. Hot medium supply line 25 is open and cold medium supply line 23 is closed. As damper 50 pivots into engagement with lug 80, lever 77 will be rotated about pivot 78 past the overcenter position and spring 82 will move arm 79 into engagement with contact 87 thus energizing solenoid 85 to open cold water supply line 23 and moving arm 81 out of engagement with contact 88 to deenergize solenoid 86, thus closing hot water supply line 25.

Due to the very small pressures existing within the bellows 54, it may under some conditions be desirable to employ a force amplifier to more positively actuate microswitch 76. One arrangement for amplifying the force is illustrated in FIGURE 4. Line 89 may be in communication with the source of primary air. Valve member 90 is adapted to be engaged by damper 50 and is easily moved by the damper against the pressure of spring 93. The valve member has a port 91 therein which is adapted to permit the free flow of air through the line 89 into bellows member 95. The valve member moves within the bearing and guide member 92. It can be seen that spring 93 for urging the valve member to the closed position is mounted in frame 94.

As bellows 95 expands, stem 97 is urged downwardly as seen in FIGURE 4 against lever 77 of microswitch 76. Within casing 96 there is provide spring 98 for urging the bellows member 95 to the collapsed position. To provide for rectilinear movement of stem 97, a bearing support 99 is provided in casing 96.

A modified construction of the preferred control arrangement is illustrated in FIGURE 5. Essentially, this control arrangement employs hydraulic switch member 101 to regulate the flow of fluid to heat exchanger 39. Switch member 101 is connected to the hot water supply by line 102. One end of outlet pipe 103 extends into switch casing 104 and the other end connects to line 107. Hot water valve 105 in hot water supply line 25 communicates with line 107 and line 108 connects line 107 with the cold water valve 106 in cold water supply line 23.

Within each valve 105, 106, there is provided a temperature-responsive mechanism, preferably a so-called "Vernatherm" element as disclosed, for example, in Patents No. 2,128,274, 2,208,149, 2,368,181 and 2,636,776. The mechanism comprises a power element extensible from its body at a predetermined temperature and contains a fusible thermally expansible material such as wax or wax embodied in a powdered heat conducting material and binder. The mechanisms 110 and 116 expand in response to heat and contract in response to cold. Stems 113 and 119 extend from elements 110 and 116, respectively, and are connected to valve members 109 and 115, respectively. The mechanisms 110 and 116 act in opposition to springs 111 and 117, respectively.

It is apparent that when mechanism 110 expands, the passage through line 25 will be opened. Upon cooling, mechanism 110 contracts and valve member 109 is moved to close the passage through valve 105. When mechanism 116 expands, the passage through cold water supply line 23 will be closed by valve member 115. When mechanism 116 contracts, the passage of medium through line 23 will be permitted. The interior of valve 106 is connected to the hot water supply line 25 downstream of the valve 105 by line 118.

Hrydraulic switch mechanism 101 includes a lever 120 pivoted on pin 121. Secured to the opposite end of lever 120 from the pivot is a valve 122 for closing the end of outlet pipe 103.

The means for operating the lever to open and close the end of outlet pipe 103 comprise an operating member 123 having thereon an end portion 124 adapted to be engaged by bypass damper 50. Adjacent the other end of operating member 123 is rack 125 which is adapted to engage a pinion gear 126. Pinion gear 126 is secured to shaft 127. Also secured to shaft 127 is cam 128. Leaf springs 130 and 131 bear upon the ends of cam 128 to act to hold the same in an initial position. Spring 129 acts in opposition to the movement of cam 128 to return lever 120 to a position wherein the outlet pipe 103 is open to receive the flow of hot water.

Provided about the operating member 123 is a spring 134, which acts between the housing or casing 104 and the flange or abutment 135 on the operating member to raise the operating member. The teeth of rack 125 are constructed to drive gear 126 when moved downwardly. When the rack is moved upwardly, the teeth of rack 125 disengage from the gear and do not affect movement of the gear. If desired, a disengaging ramp may be provided beneath the rack such that when the operating member is pushed downwardly to the limit of its movement, the rack engages the disengaging ramp and the teeth of the rack are disengaged from gear 126. Spring 134 urges the operating member upwardly.

*Operation*

Consider the operation of the air conditioning system having induction units utilizing the control arrangement of FIGURE 3. Primary air is supplied from central station 10 through the riser 18 to plenum chamber 35 in each unit 20. The primary air is discharged through nozzles 36 inducing secondary air from the areas 21 through inlet 47 into each unit 20. Counterbalance 53 urges damper 50 clockwise as viewed in FIGURE 2 to close the bypass passage 44 so that all the secondary air induced into the unit passes through heat exchanger 39. Primary control air flows from plenum chamber 35 through line 58, filter 59, pressure regulator 61 and restriction T 63 through line 65 to the expansible member or bellows 49. Assuming that there is cold water in the return line, thermal actuator 68 of changeover valve 67 senses the temperature of the medium and moves valve 67 to place line 66 in communication with line 67'. The outlet from line 67 is open permitting air to bleed to the atmosphere. Bellows 54 therefore, has insufficient control pressure therein and the damper 50 remains under control of counterbalance 53. The induced air passes over heat exchanger 39 and is cooled.

Assuming now that the room temperature approaches the desired level, bimetal 75 warps to throttle the outlet from line 67'. The pressure builds within the bellows 54 and damper 50 is moved to open passage 44. If the room temperature drops further, such that bimetal 75 closes the outlet from line 67' and damper 50 moves to a position fully opening passage 44, damper 50 will contact lug 81 and pivot lever 77. Arm 81 engages contact 88, thus engaging solenoid 86, and permitting the flow of hot medium to heat exchanger 39. Arm 79 moved out of engagement with contact 87, thus deenergizing solenoid 85 and closing line 23.

Thermal actuator 68 senses the temperature of the hot conditioning medium and causes valve 67 to move so as to communicate with line 66 and with line 67″. The movement of bimetal 74 now controls the pressure within bellows 54.

As the room heats back to the desired temperature, bimetal 74 moves toward closed position causing a pressure rise within bellows 54 and causing the damper to open passage 44 bypassing more air about heat exchanger 39. When the desired temperature is attained, bimetal 74 bleeds a limited amount of air and the damper is positioned so as to maintain the desired temperature.

Microswitch 76 is actuated only at the full open position of damper 50. Thus it is seen that in cooling operation, in a particular area 21, either cold or hot conditioning medium is automatically and selectively supplied to heat exchanger 39 to effectively maintain desired temperature.

The control arrangement illustrated in FIGURE 5 functions in essentially the same manner as the preferred control arrangement. Primary air is delivered from central station 10 to each unit 20. Room air is induced over coil 39 by the discharge of primary air from nozzle 36.

Assume that there is a demand for cooling and that there is cold water in return line 28. Thermal actuator 68 senses the temperature of the cold water and moves valve 67 to place line 66 in communication with line 67′. The outlet from line 67′ is open, permitting air to bleed to the atmosphere. Counterbalance 53 rotates shaft 51 and urges damper 50 counterclockwise to close the bypass passage and permit the induced air to pass over heat exchanger 39 and be cooled.

As the room temperature approaches the desired level, bimetal 75 warps to throttle the air passing from the outlet from line 67′. The pressure increases within bellows 54 and damper 50 is moved to open passage 44 and decrease the quantity of air passing over heat exchanger 39. Upon attainment of the desired temperature bimetal 75 will bleed the proper quantity of air from the outlet from line 67′ to maintain such pressure within the bellows 54 as to hold damper 50 in proper position.

If the room temperature drops further, bimetal 75 closes the outlet from line 67′ and damper 50 moves to contact and push operating member 123 downwardly. Rack 125 rotates gear 126 and cam 128 ninety degrees. Rack 125 is disengaged from gear 126 and operating member 123 is raised by spring 134 to its initial position. Spring 129 raises lever 120 and valve 122 is unseated from outlet 103.

Hot water passes through lines 107 and 108 to valves 105 and 106, respectively. Elements 110 and 116 are heated by the hot water and expand. Valve member 109 is moved to open line 25 to the flow of hot water and valve member 115 is moved to terminate the passage of cold water through valve 106.

Thermal actuator 68 senses the flow of hot water in return line 28 and causes valve 67 to communicate line 66 with line 67″. Bimetal 74 again controls the pressure within bellows 54. As the room temperature rises to the desired level, bimetal 74 throttles the outlet from line 67″ causing pressure to rise within bellows 54. Damper 50 is pivoted to open bypass passage 44. At the desired temperature, bimetal 74 bleeds the air from line 67″ at an appropriate rate to maintain damper 50 in position to bypass adequate induced air to maintain the proper temperature.

If the room temperature rises above the desired level, bimetal 74 closes the outlet from line 67″. Damper 50 pivots into engagement with pin 124. Rack 125 rotates gear 126 and cam 128 ninety degrees causing lever 120 to pivot and seat valve 122 in the outlet pipe 103.

Termination of the supply of hot water to valves 105 and 106 causes elements 110 and 116 to contract. Spring 111 urges valve member 109 upwardly to close the passage through valve 105 and valve member 115 is urged upwardly by spring 117 to open line 23 and permit passage of cold water.

Thermal actuator 68 senses the temperature of the cold water in the return pipe and causes valve 67 to communicate line 66 with line 67′. Bimetal 75 again assumes control and regulates the discharge of air from the outlet of line 67 in response to the temperature of secondary air passing over bimetal 75. When the desired temperature is attained, bimetal 75 bleeds just enough air to maintain damper 50 in position to bypass the proper quantity of induced air.

The present invention provides an air conditioning system for efficiently heating and cooling different zones in a multiple-zone building. The induction units used in the air conditioning system of the present invention have been provided with novel controls which automatically regulate the flow of hot conditioning medium and cold conditioning medium to the heat exchanger in such units through all seasons of operation.

While we have described presently preferred embodiments of the invention, it will be understood that the invention is not limited thereto since it may be otherwise embodied within the scope of the following claims.

We claim:

1. An air conditioning system for a building having a zone requiring heating and a zone requiring cooling comprising a central station remote from said zones, at least one induction unit in each zone, means for delivering a quantity of high pressure conditioned air from said central station to said units, means in each unit for discharging the conditioned air within said units at relatively high velocity so as to induce zone air into said units, a heat exchanger in each unit, means for supplying cold conditioning medium to said heat exchanger, means for supplying hot conditioning medium to said heat exchanger, valve means to regulate the flow of conditioning medium to the heat exchanger, means to return conditioning medium from each of said units in a single return stream for recirculation, a damper in each unit for controlling the quantity of induced air passing over or bypassing each heat exchanger, means for actuating the damper, and means responsive to a predetermied position of the damper for automatically controlling the valve means to determine whether either hot conditioning medium or cold conditioning medium is supplied to the associated heat exchanger.

2. An air conditioning system as in claim 1 wherein a first solenoid-actuated valve is provided in the cold conditioning medium supply means and a second solenoid-actuated valve is provided in the hot conditioning medium supply means.

3. An air conditioning system as in claim 1 wherein said damper actuating means comprises a member responsive to conditioned air pressure.

4. In an air conditioning system for a multiple-zone building having a zone to be cooled and a zone to be heated, a conditioner remote from said zones for treating air, a plurality of induction units, at least one in each zone to be conditioned, means for delivering a quantity of conditioned air from said conditioner to each induction unit, means in each induction unit for discharging the conditioned air within said unit at relatively high velocity, means for supplying within the units other air from within the zones induced by the high velocity discharge of conditioned air within the units, means for discharging said conditioned air and said induced air from each unit into the zone served thereby, a heat exchange member in each unit, means for supplying warm conditioning medium to said heat exchange member, means for supplying cold conditioning medium to said heat exchange member, a bypass damper in each induction unit for regulating the quantity of induced air passing over the associated heat exchange member, and means responsive to a predetermined position of the bypass damper for determining automatically whether warm conditioning medium or cold conditioning medium is supplied to the associated heat exchange member.

5. An air conditioning system for a multiple-zone building which requires heating and cooling comprising a central station, means for supplying conditioned air from the central station to each zone to be treated, at least one air conditioning unit in each zone in communication with the supply means, each air conditioning unit containing a heat exchange member, an inlet for zone air and an outlet, means for supplying a hot conditioning medium to the heat exchange members of the units, means for supplying a cold conditioning medium to the heat exchange members of the units, a damper in each unit for regulating the quantity of zone air induced through the inlet over each heat exchange member by the discharge of conditioned air into each unit, and means for automatically determining whether hot or cold conditioning medium is supplied to a heat exchange member in response to a predetermined position of the damper.

6. In an air conditioning unit, the combination of a casing having an inlet and an outlet, a plenum chamber in said casing, means for supplying primary air to said plenum chamber, a heat exchanger in said casing, means for supplying cold medium to said heat exchanger, means for supplying hot medium to said heat exchanger, the discharge of primary air through said outlet inducing air to be treated into said casing through said inlet, damper means for regulating the quantity of induced air passing over or bypassing said heat exchanger, control means for selectively positioning the damper means, and means responsive to a predetermined position of the damper means for selectively actuating the cold medium supplying means or the hot medium supplying means.

7. An air conditioning unit as in claim 6 wherein said control means is responsive to primary air pressure.

8. An air conditioning unit as in claim 6 wherein said cold medium supplying means and said hot medium supplying means each comprise a valve actuated by a solenoid.

9. An air conditioning unit as in claim 8 wherein said position responsive actuating means comprises switch means for energizing the solenoids.

10. In an induction unit, the combination of a casing having an inlet and an outlet, a plenum chamber, means for supplying conditioned air to said plenum chamber, a heat exchanger, nozzle means secured to said plenum chamber for discharging conditioned air through the outlet into an area to be treated and for inducing air from said area to be treated through the inlet and over said heat exchanger, means for supplying hot medium to said heat exchanger, means for supplying cold medium to said heat exchanger, first valve means in said hot supply means, second valve means in said cold supply means, a damper for regulating the quantity of air passing over or bypassing the heat exchanger, and means actuated by said damper for selectively actuating the first and second valve means to regulate the flow of medium to the heat exchanger.

11. An induction unit as in claim 10 wherein said first and second valve means are solenoid actuated and said damper actuated means include a switch for energizing and deenergizing said solenoids.

12. An induction unit as in claim 10 wherein said first and second valve means are thermal actuated and said damper actuated means include a hydraulic switch.

13. A method of conditioning air in a multiple-zone building which requires heating and cooling comprising the steps of supplying primary air from a central station to induce zone air to pass in heat exchange relation with a heat exchange member, moving a damper to regulate the quantity of zone air being passed in heat exchange relation with the heat exchange member, supplying a hot conditioning medium to the heat exchange member, supplying a cold conditioning medium to the heat exchange member, and selecting the supply of conditioning medium to the heat exchange member in response to a predetermined position of the damper.

References Cited by the Examiner

UNITED STATES PATENTS

| | | | |
|---|---|---|---|
| 2,238,689 | 4/41 | Locke | 165—21 |
| 2,249,484 | 7/41 | Miller et al. | 165—28 |
| 3,018,088 | 1/62 | Allander et al. | 165—103 |
| 3,122,201 | 2/64 | Ashley et al. | 165—123 X |

ROBERT A. O'LEARY, *Primary Examiner.*

CHARLES SUKALO, *Examiner.*